(12) United States Patent
Maruyama et al.

(10) Patent No.: US 7,374,823 B2
(45) Date of Patent: May 20, 2008

(54) WELDED PORTION CONSTITUTION AND WELDING METHOD

(75) Inventors: Hisanao Maruyama, Fujisawa (JP); Rikuo Osaki, Fujisawa (JP); Youichi Koyama, Fujisawa (JP)

(73) Assignee: Press Kogyo Co., Ltd., Kawasaki-shi (JP)

( * ) Notice: Subject to any disclaimer, the term of this patent is extended or adjusted under 35 U.S.C. 154(b) by 197 days.

(21) Appl. No.: 10/786,262

(22) Filed: Feb. 25, 2004

(65) Prior Publication Data

US 2004/0169062 A1  Sep. 2, 2004

(30) Foreign Application Priority Data

Feb. 28, 2003 (JP) ............................ 2003-053580
Dec. 4, 2003 (JP) ............................ 2003-406159

(51) Int. Cl.
*F16L 47/02* (2006.01)
(52) U.S. Cl. ....................... 428/544; 403/270
(58) Field of Classification Search ............ None
See application file for complete search history.

(56) References Cited

U.S. PATENT DOCUMENTS

| | | | | |
|---|---|---|---|---|
| 2,752,172 A | * | 6/1956 | Ziebold | 138/121 |
| 4,408,112 A | * | 10/1983 | Kazlauskas | 219/61 |
| 4,558,695 A | * | 12/1985 | Kumazawa et al. | 228/183 |
| 4,923,100 A | * | 5/1990 | Nakamura et al. | 228/117 |
| 5,102,032 A | * | 4/1992 | Cottone et al. | 228/183 |
| 5,428,198 A | * | 6/1995 | Peigney et al. | 219/61 |
| 2003/0180570 A1 | * | 9/2003 | Cercone et al. | 428/626 |
| 2004/0008807 A1 | * | 1/2004 | Willis et al. | 376/260 |
| 2005/0205527 A1 | * | 9/2005 | Remond et al. | 219/76.14 |

FOREIGN PATENT DOCUMENTS

| | | | |
|---|---|---|---|
| DE | 3610378 A | * | 10/1987 |
| GB | 2114489 A | * | 8/1983 |
| JP | 08-067108 | | 3/1996 |
| JP | 09-300904 | | 11/1997 |
| JP | 2001071141 A | * | 3/2001 |

* cited by examiner

*Primary Examiner*—Kiley Stoner
(74) *Attorney, Agent, or Firm*—McCormick, Paulding & Huber LLP

(57) ABSTRACT

The present invention is a welded portion constitution between a first member (38) and a second member (33), comprising an inclined portion (3) provided on an end portion of at least one of the first member (38) and second member (33), and a weld bead (5) provided so as to cover at least a part of the inclined portion (3). According to the present invention, the strength of the welded joint portion can be improved without increasing the sheet thickness of the first member (38) or second member (33), and without increasing the number of components.

7 Claims, 9 Drawing Sheets

WELDED PORTION CONSTITUTION AND WELDING METHOD

CROSS REFERENCE TO RELATED APPLICATION

This application claims priority to Japanese Patent Application 2003-406159 (filed on Dec. 4, 2003) and Japanese Patent Application 2003-53580 (filed on Feb. 28, 2003). The content of these Japanese applications is incorporated into this specification by reference.

BACKGROUND OF THE INVENTION

1. Field of the Invention

The present invention relates to the constitution of a welded portion between a plurality of members, and a welding method.

2. Description of the Related Art

Welding has been used conventionally on various manufacturing sites as a means of joining metallic members to each other. For example, welding is performed in the manufacturing process of a vehicle axle case.

An axle case accommodates the driving shaft, differential gear, and so on of a vehicle such as a truck, and as shown in FIG. 10, comprises a main body 38 extending in the vehicle width direction of the vehicle and constituted by an upper member 30 and a lower member 31 which are joined by being laid one above the other such that the two end portions in the longitudinal direction are formed into a substantially cylindrical form, and a substantially cylindrical spindle 33 which is joined to the two end portions in the longitudinal direction of the main body 38. The upper and lower members 30, 31 are curved upward or downward at the central portion thereof in the longitudinal direction to form a substantially circular hole (not shown in the drawing) in the central portion in the longitudinal direction of the main body 38. A hemispherical cover member 32 is mounted on the main body 38 so as to cover the hole. An axle case typically has an assembled sheet metal structure, and similar axle cases are described in Japanese Patent Application Publication H08-067108 and so on, for example.

In this type of axle case 34, the two end portions in the longitudinal direction of the main body 38 and the spindle 33 are joined by butt welding. More specifically, as shown in FIG. 11, an end portion of the main body 38 and an end portion of the spindle 33 are caused to abut and then joined by welding. Note that FIG. 11 shows a cross section of an upper portion joint portion between the main body 38 and spindle 33.

Further, the cover member 32 and the upper and lower members 30, 31 are joined by being laid together and fillet welded. More specifically, as shown in FIG. 12, a flange 32a formed on the peripheral edge portion of the cover member 32 is superposed on the upper and lower members 30, 31 and joined thereto by fillet welding.

Incidentally, various loads and moments act on the axle case 34 as a result of acceleration, deceleration, and changes of direction in the vehicle, irregularities on the surface of the road along which the vehicle is traveling, and so on. In particular, moments often act to bend the axle case 34 in an upward or downward direction. For example, a driving wheel is provided on the outer peripheral portion of the spindle 33, and hence when an upward reactive force is received from the road surface, a moment M (see FIG. 10) acts to raise the two longitudinal direction end portions which serve as supports for the substantial central portion of the axle case 34 in the longitudinal direction.

As a result, stress is generated on the joint portion between the main body 38 and the spindle 33.

Accordingly, a comparatively high degree of strength is required in the welded portion between the main body 38 and spindle 33. To achieve this, conventionally the penetration ratio of the joint portion between the main body 38 and spindle 33 in relation to the sheet thickness of the main body 38 and spindle 33 has been set at 100%.

If the penetration ratio is set at 100% when butt welding a sheet material, welding is usually performed from both the front and rear sides of the sheet material. However, the spindle 33 takes a form in which the outside end portion thereof has a reduced diameter, and it is therefore difficult to insert a welding rod or the like into the interior and to perform welding from the rear. If welding is performed only from the front side with a large enough energy input to ensure a penetration ratio of 100%, weld metal drips onto the rear side of the joint portion, leading to possible interference with the driving shaft and so on incorporated in the axle case 34. In extreme cases, a hole opens in the joint portion, leading to oil leaks and a reduction in the strength of the joint portion.

Hence, as shown in FIG. 11, a cylindrical strip 39 is inserted into the joint portion between the main body 38 and spindle 33. In so doing, weld metal can be prevented from dripping into the interior of the axle case 34 even when the penetration ratio is set at 100%.

However, demands have been made for further strengthening of the welded joint portions of the axle case 34 and so on.

For example, in the conventional welded portion constitution and welding method described above, a non-welded part 40 on the contact surface between the strip 39 and main body 38 and the strip 39 and spindle 33 may act as a preformed crack, causing stress to become concentrated in welding root portions 41 on the inner surface side of the welded portion. As a result, cracks may form from these points.

Moreover, contraction of the weld metal following welding may cause residual stress at the joint portion between the main body 38 and spindle 33. In this case, compressive stress in the longitudinal direction (the left/right direction in the drawing), which is beneficial in terms of strength, remains on the outer surface side of the joint portion, whereas tensile stress in the longitudinal direction, which is detrimental to strength, remains on the inner surface side of the joint portion.

In short, tensile stress remains on the inner surface side of the joint portion between the main body 38 and spindle 33 conventionally, and thus when an outside force is applied to the axle case 34, the stress becomes concentrated, leading to a possibility of cracking and the like.

In order to improve the strength of the welded joint portion between the main body 38 and the spindle 33, increasing the sheet thickness of the main body 38 and spindle 33 to increase the effective height of the welded joint portion has been considered, but in this case, the overall weight and cost of the axle case 34 rise.

Further, when the moment M (see FIG. 10) acts on the axle case 34 as described above, compressive stress is generated in the central portion of the upper member 30, whereas tensile stress is generated in the central portion of the lower member 31, and hence the circular hole formed by the joint portions therebetween deforms. As a result, a load which causes the cover member 32 and the upper and lower members 30, 31 to peel away from each other acts on these joint portions.

When a large load acts on the joint portion between the cover member 32 and the upper and lower members 30, 31 in this manner, stress concentrates in a part A (see FIG. 12) of the welded portion having the least strength, leading to the possible occurrence of cracking in this part. If a crack reaches the outer surface of the cover member 32, lubricating oil leaks out from the interior, causing a deficiency in the lubrication of the differential gear.

To prevent this, methods of increasing the sheet thickness t of the cover member 32 or providing an annular reinforcing sheet between the cover member 32 and the upper and lower members 30, 31 in order to increase the strength of the joint portion have been considered. However, these methods all lead to increases in the overall weight and manufacturing cost of the axle case 34, and are therefore unfavorable. Particularly in cases where a reinforcing sheet is provided, the number of components rises, and thus the number of production steps, assembly steps, and welding steps increases, leading to a large increase in manufacturing cost.

SUMMARY OF THE INVENTION

An object of the present invention is to solve the problems described above by providing a welded portion constitution and welding method according to which the strength of a welded joint portion can be increased without increasing the sheet thickness of the members or increasing the number of components.

The present invention for achieving this object is a welded portion constitution between a first member and a second member, comprising an inclined portion provided on an end portion of at least one of the first member and second member, and a weld bead provided so as to cover at least a part of the inclined portion.

The present invention is also a method of welding a first member and a second member, comprising the steps of forming an inclined portion by bending an end portion of at least one of the first member and second member, and welding the first member to the second member such that a weld bead is formed on at least a part of the inclined portion.

Further, the present invention is a constitution for a butt-welded portion between tubular members in which a tubular strip is inserted into the inside of the abutting portion, comprising a contact portion formed on an end portion of at least one of the tubular members in contact with the strip, an inclined portion formed in series with the contact portion and inclined from the contact portion in a direction away from the strip, a stepped portion formed in series with the inclined portion and disposed at a predetermined interval from the strip, and a weld bead provided so as to cover the contact portion and at least a part of the inclined portion.

Here, the contact length between the contact portion and strip may be set within a range of approximately thirty to sixty percent of the sheet thickness of the tubular member.

Further, the interval between the stepped portion and strip may be set within a range of approximately twenty to fifty percent of the sheet thickness of the tubular member.

Further, the present invention is an axle case comprising a main body in which both end portions in the longitudinal direction are formed in a tubular form, a tubular spindle which is joined to the two ends in the longitudinal direction of the main body, and a tubular strip which is inserted into the inside of an abutting portion between the main body and spindle. This axle case comprises a contact portion formed on an end portion of the main body and/or the spindle in contact with the strip, an inclined portion formed in series with the contact portion and inclined from the contact portion in a direction away from the strip, a stepped portion formed in series with the inclined portion and disposed at a predetermined interval from the strip, and a weld bead provided so as to cover the contact portion and at least a part of the inclined portion.

Further, the present invention is a butt welding method for welding tubular members to each other in which a tubular strip is inserted into the inside of the abutting portion, comprising the steps of: bending an end portion of at least one of the tubular members to form a contact portion which contacts the strip, an inclined portion formed in series with the contact portion and inclined from the contact portion in a direction away from the strip, and a stepped portion formed in series with the inclined portion and disposed at a predetermined interval from the strip; and butt welding the tubular members to each other such that a weld bead is formed over the contact portion and at least a part of the inclined portion.

The present invention is also a constitution for a fillet-welded portion between a sheet material and a base material, comprising a contact portion formed on an end portion of the sheet material in contact with the base material, an inclined portion formed in series with the contact portion and inclined from the contact portion in a direction away from the base material, a stepped portion formed in series with the inclined portion and disposed at a predetermined interval from the base material, and a weld bead provided so as to cover the contact portion and at least a part of the inclined portion.

Here, the contact length between the contact portion and the base material may be set within a range of approximately thirty to sixty percent of the sheet thickness of the sheet material.

Further, the interval between the stepped portion and the base material may be set within a range of approximately twenty to fifty percent of the sheet thickness of the sheet material.

Further, the present invention is an axle case comprising an upper member and a lower member extending in the direction of vehicle width of a vehicle and joined by being abutted against each other, each having a bent portion which is bent into a substantially circular shape so as to protrude in an upward or downward direction from a central portion in the longitudinal direction, and a hemispherical cover member which is joined to the upper and lower members by fillet welding so as to cover a hole formed in the central portion of the joint portion between the upper and lower members in the longitudinal direction. This axle case comprises a contact portion formed on a peripheral edge portion of the cover member in contact with the upper and lower members, an inclined portion formed in series with the contact portion and inclined from the contact portion in a direction away from the upper and lower members, a stepped portion formed in series with the inclined portion and disposed at a predetermined interval from the upper and lower members, and a weld bead provided so as to cover the contact portion and at least a part of the inclined portion.

Further, the present invention is a method of fillet welding a sheet material and a base material, comprising the steps of: bending an end portion of the sheet material to form a contact portion which contacts the base material, an inclined portion formed m series with the contact portion and inclined from the contact portion in a direction away from the base material, and a stepped portion formed in series with the inclined portion and disposed at a predetermined interval from the base material; and fillet welding the sheet material to the base material such that a weld bead is formed over the contact portion and at least a part of the inclined portion.

BRIEF DESCRIPTION OF THE DRAWINGS

FIG. 9b is an enlarged sectional view of the joint portion in FIG. 9a.

DESCRIPTION OF THE PREFERRED EMBODIMENTS

Preferred embodiments of the present invention will be described in detail below on the basis of the attached drawings.

Figure 1:
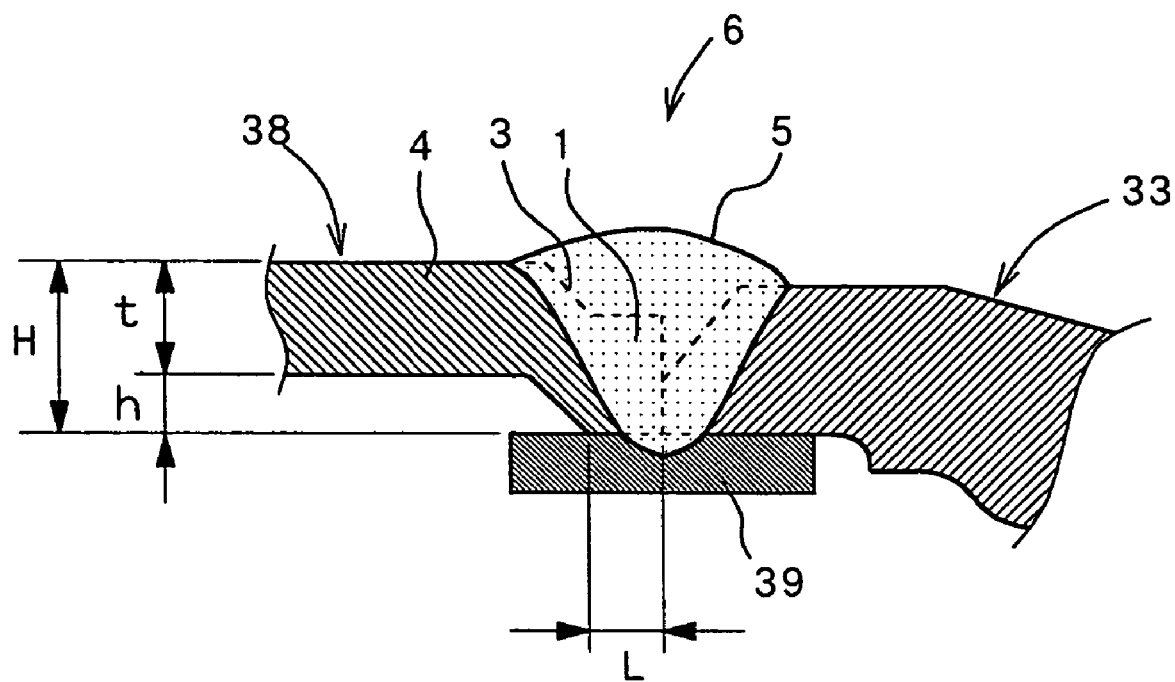
FIG. 1 is a sectional view of a welded portion constitution according to an embodiment of the present invention.

This embodiment illustrates an example in which the welded portion constitution and welding method of the present invention are applied to a joint portion between a main body and a spindle of a vehicle axle case. FIG. 1 is a sectional view of the upper portion of a welded joint portion between a main body (first member) and a spindle (second member).

Figure 10:
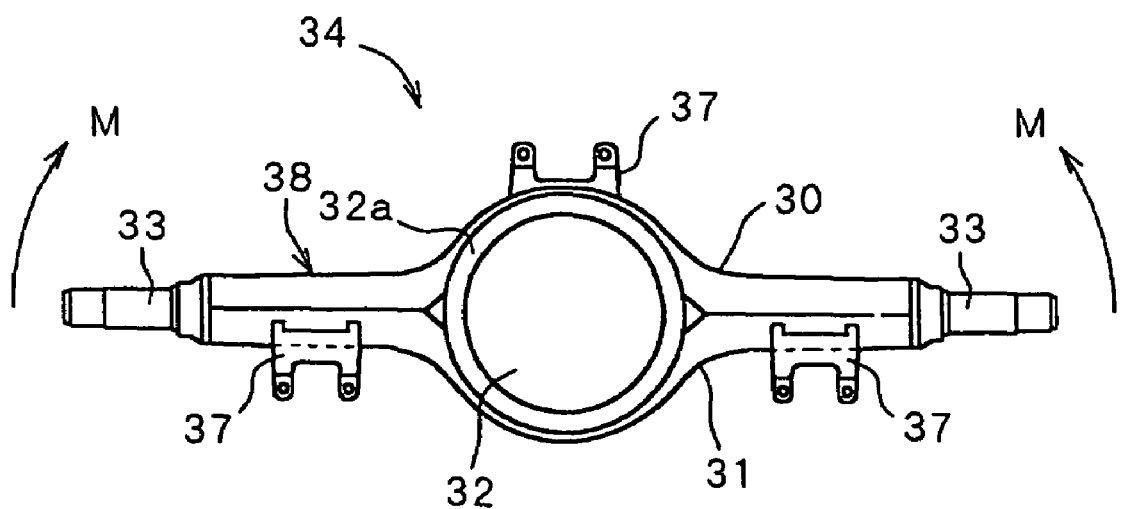
FIG. 10 is a front view of an axle case.

The schematic constitution of the axle case of this embodiment is similar to that shown in FIG. 10. That is, the axle case of this embodiment comprises a main body (tubular member) 38 constituted by an upper member 30 and a lower member 31 which are joined by being laid one above the other such that the two end portions in the longitudinal direction are formed into a substantially cylindrical form, and a substantially cylindrical spindle (tubular member) 33 which is joined to the two end portions in the longitudinal direction of the main body 38. The upper and lower members 30, 31 are curved upward and downward at the central portion thereof in the longitudinal direction to form a substantially circular hole (not shown in the drawing) in the central portion in the longitudinal direction of the main body 38. A hemispherical cover member 32 is mounted on the main body 38 so as to cover the hole.

As shown in FIG. 1, the end portions of the main body 38 and spindle 33 are caused to abut against each other, and a cylindrical strip 39 is inserted into and disposed in the inside inner surface) of the abutting portion. Welding is then performed from the outer surface side (the upper side in the drawing) of the main body 38 and spindle 33 to join the two members together. At this time, the welding penetration ratio is set to at least 100% of the sheet thickness t of the main body 38 and spindle 33.

The welded joint portion between the main body 38 and spindle 33 in this embodiment is characterized in that the joint end portion of the main body 38 (the abutting end portion with the spindle 33) has a reduced diameter. More specifically, the end portion of the main body 38 is formed with a contact portion 1 which contacts the outer surface of the strip 39 that is inserted inside the abutting portion between the main body 38 and the spindle 33 and has a substantially identical diameter to the end portion of the spindle 33, an inclined portion 3 formed in series with the contact portion 1 and inclined from the contact portion 1 in a direction away from the strip 39, and a stepped portion 4 formed in series with the inclined portion 3 and disposed at a predetermined interval h from the outer surface of the strip 39 in the diametrical direction. The main body 38 having this stepped end portion can be manufactured comparatively easily during press molding of the upper member 30 and lower member 31 by molding the end portion of each member 30, 31 into a stepped form.

The welded portion constitution between the main body 38 and spindle 33 also comprises a weld bead 5 which covers the outer surface of the contact portion 1 and at least a part of the outer surface of the inclined portion 3 on the main body 38. In other words, the welded portion constitution is formed by causing the main body 38 and spindle 33 to abut against each other, inserting the cylindrical strip 39 into the inside of the abutting portion, and butt welding the main body 38 and spindle 33 such that a weld bead 5 is formed over the outer surface of the contact portion 1 and at least a part of the outer surface of the inclined portion 3 on the main body 38.

Figure 11:
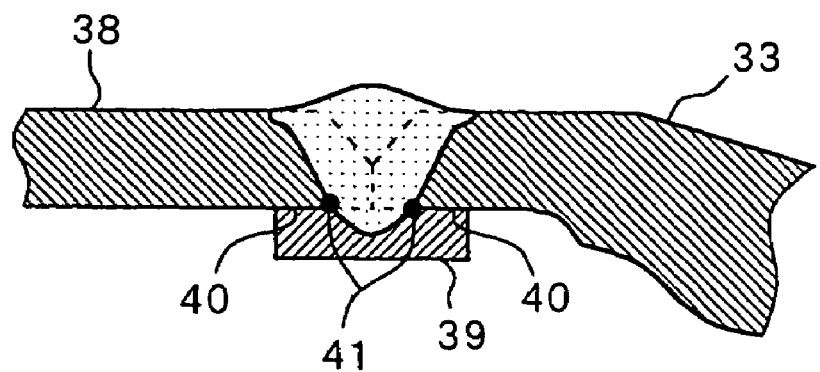
FIG. 11 is a sectional view of a welded joint portion between a main body and a spindle of a conventional axle case.

In this embodiment, the weld bead 5 is formed over the entire outer surface of the inclined portion 3. Accordingly, the effective height H of a joint portion 6 between the main body 38 and spindle 33 is substantially equal to the distance from the outer surface of the cylindrical strip 39 to the outer surface of the stepped portion 4. As described above, the stepped portion 4 is disposed at an interval corresponding to the distance h from the outer surface of the strip 39, and hence the effective height H of the joint portion 6 is larger than the sheet thickness t of the main body 38 substantially by the distance h (H≈t+h). Hence, by forming the end portion of the main body 38 in stepped form (inclined form) and welding the stepped portion (inclined portion) to the spindle 33 and the strip 39, this welded portion constitution and welding method achieve an increase in the effective height H of the joint portion 6 without increasing the sheet thickness t of the main body 38. In other words, by forming the end portion of the main body 38 in stepped form, the welded portion constitution and welding method of this embodiment achieve an increase in the formation area of the weld bead 5 (in a conventional welded portion constitution such as that shown in FIG. 11, the formation area of the weld bead is substantially equal to the sheet thickness of the main body 38).

Hence in the welded portion constitution and welding method of this embodiment, the effective height H of the joint portion 6 between the main body 38 and spindle 33 is larger than the sheet thickness t of the main body 38, and thus an improvement in the strength of the joint portion 6 which is substantially identical to that achieved by increasing the sheet thickness t of the main body 38 is obtained. In other words, the sectional area of the joint portion 6 between the main body 38 and spindle 33 is larger than that of a conventional welded portion, and hence stress generated in the joint portion 6 by various loads and moments acting on the axle case 34 is reduced. As a result, cracking and the like caused by stress concentration can be prevented.

Note that in this embodiment, an example was described in which the weld bead 5 is formed over the entire outer surface of the inclined portion 3, but the present invention is not limited on this point, and as long as the weld bead 5 is formed so as to cover at least a part of the outer surface of the inclined portion 3, the effect of an improvement in strength (a stress reduction effect) over a conventional welded portion constitution and welding method can be obtained.

Further, according to the welded portion constitution and welding method of this embodiment, the strength of the joint portion 6 can be improved without increasing the sheet thickness t of the main body 38 or providing a separate reinforcing member, and hence there is no increase in the overall weight or number of components of the axle case 34. There is also no large increase in the manufacturing cost.

The present inventors have confirmed that by setting the various dimensions of the stepped portion on the main body 38 within a predetermined range, the stress reduction effect (or in other words, strength improvement effect) can be obtained even more effectively. This will be described below using FIG. 1.

Figure 2:
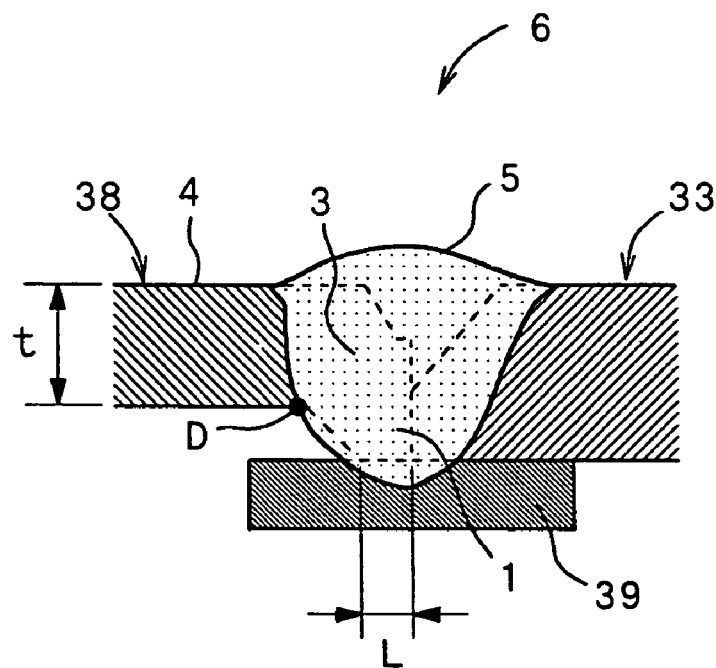
FIG. 2 is a sectional view showing an example in which the contact length of a contact portion is too short.

First, the contact length (axial length) L between the contact portion 1 and the strip 39 is set within an optimum range of approximately thirty to sixty percent of the sheet thickness t of the main body 38. If the contact length L is too short, for example, as shown in FIG. 2, the penetration of the weld bead 5 over the contact portion 1 becomes too large, and the weld bead 5 penetrates to the inner surface side of the inclined portion 3. As a result, stress may concentrate at the point in the drawing indicated by D. Further, as shown in FIG. 2, if the weld bead 5 covers the entirety of the contact portion 1 and inclined portion 3, the stepped portion 4 may melt down. Hence the contact length L is preferably set such that the weld bead 5 does not penetrate the entire inner surface of the contact portion 1.

Figure 3:
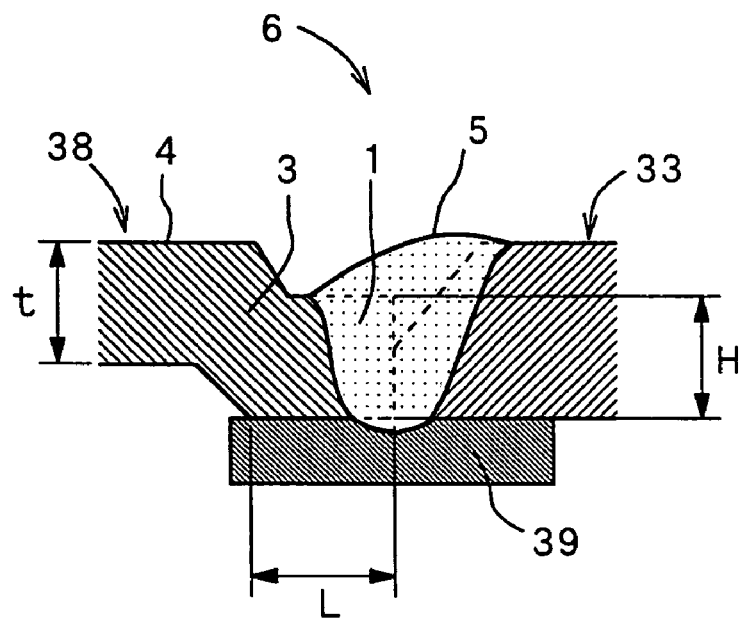
FIG. 3 is a sectional view showing an example in which the contact length of the contact portion is too long.

Conversely, if the contact length L is too large, as shown in FIG. 3, it becomes impossible to form the weld bead 5 over the inclined portion 3. As a result, the effective height H of the welded joint portion 6 becomes substantially equal to the sheet thickness t of the main body 38, and the stress reduction effect described above cannot be obtained.

The interval h between the stepped portion 4 and the cylindrical strip 39 shown in FIG. 1 is set within an optimum range of approximately twenty to fifty percent of the sheet thickness t of the main body 38. If, for example, the interval h is too small, the effective height H of the welded joint portion 6 is little larger than the sheet thickness t of the main body 38, and hence the stress reduction effect is small. If the interval h is too large, it becomes difficult to form the weld bead 5 over the outer surface of the inclined portion 3.

Figure 4A:
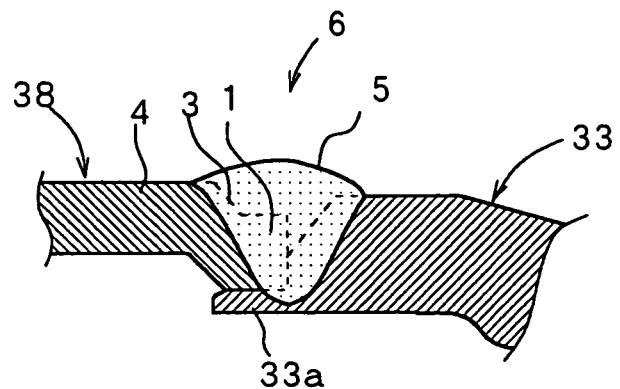
FIG. 4a is a sectional view of a welded portion constitution according to another embodiment of the present invention.

Note that in this embodiment, an example was described in which the cylindrical strip 39 is used by being inserted into the inside of the joint portion (abutting portion) between the main body 38 and spindle 33, but as shown in FIG. 4*a*, a similar effect to that of FIG. 1 can be obtained by forming a protruding portion 33*a*, which protrudes in an axial direction, integrally with the inside part of the end portion of the spindle 33 in the diametrical direction, and having this protruding portion 33*a* function as the strip 39.

Figure 4B:
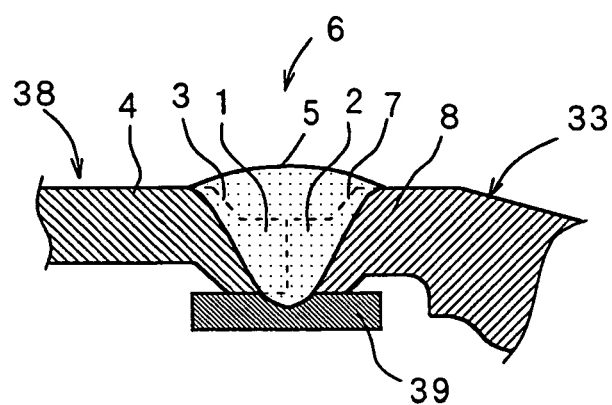
FIG. 4b is a sectional view of a welded portion constitution according to another embodiment of the present invention.

Also in this embodiment, an example was described in which the contact portion 1, inclined portion 3, and stepped portion 4 are formed on the end portion of the main body (first member) 38, but the present invention is not limited on this point. For example, as shown in FIG. 4*b*, contact portions 1, 2, inclined portions 3, 7, and stepped portions 4, 8 may be formed respectively on the end portions of both the main body (first member) 38 and the spindle (second member) 33. Alternatively, a contact portion 2, inclined portion 3, and stepped portion 8 may be formed only on the end portion of the spindle (second member) 33. Naturally in these embodiments also, a similar effect to that of the embodiment shown in FIG. 1 is obtained.

Further, in the present invention the end portion of the main body 38 and/or the spindle 33 does not necessarily have to be reduced in diameter around the entire circumference. More specifically, moments acting on an axle case often act in a vertical direction, as noted above, and hence the end portion of the main body 38 and/or the spindle 33 may be compressed in at least the vertical direction such that the contact portions 1, 2, inclined portions 3, 7, and stepped portions 4, 8 are formed only on the upper portion and lower portion. In this case, the main body 38 and/or the spindle 33 may be fitted into a die and pressed in the vertical direction such that the vertical direction dimension alone is shortened without altering the left/right direction dimension.

Further, an example was described in which the end portion of the main body 38 and/or the spindle 33 is reduced in diameter and formed with the contact portions 1, 2, inclined portions 3, 7, and stepped portions 4, 8, but it goes without saying that on the contrary, a part of the main body 38 and/or the spindle 33 that is further toward the inside than the end portion by a predetermined distance may be increased in diameter (by pipe expanding) and formed with the contact portions 1, 2, inclined portions 3, 7, and stepped portions 4, 8.

Up to this point, examples in which the present invention is applied to a joint portion between the main body 38 and spindle 33 of the axle case 34 has been described, but the present invention is also applicable to joints between various members.

Figure 4C:
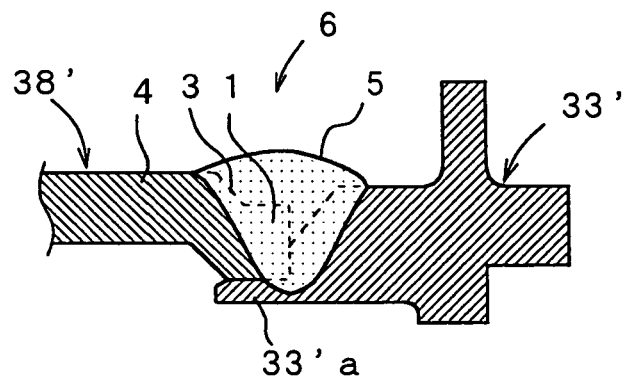
FIG. 4c is a sectional view of a welded portion constitution according to another embodiment of the present invention.

For example, the welded portion constitution and welding method of the present invention may be applied to a joint portion between a main body 38' and an end flange 33' of a semi-floating type axle case as shown in FIG. 4*c*. In this case, a similar effect to the embodiment of the axle case 34 described above can be obtained.

Figure 4D:
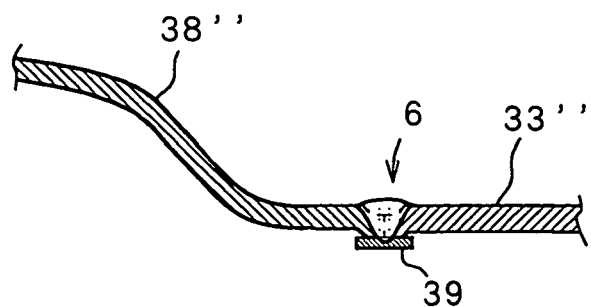
FIG. 4d is a sectional view of a welded portion constitution according to another embodiment of the present invention.

Further, as shown in FIG. 4d, the welded portion constitution and welding method of the present invention may be applied to a joint portion between a central portion main body 38" and a main body 33" on both end portions (only one of the end portion main bodies is shown in drawing) of an axle case in which the main body is divided into three in the left/right direction. Note that in the drawing, the numeral 39 indicates a strip inserted into the abutting portion between the central portion main body 38" and end portion main body 33". In a conventional axle case divided into three, the two end portion main bodies 33" have to be expanded to secure the strength of the joint portion, but by applying the welded portion constitution and welding method of the present invention to the joint portion, the same effect as that obtained by increasing the sheet thickness of the joint portion can be obtained, and hence expansion is unnecessary. As a result, a material with low moldability (good strength) can be used, and an increase in the freedom for setting the mounting positions of various brackets is achieved.

Next, a further embodiment of the present invention will be described in detail on the basis of FIG. 5.

In this embodiment, the present invention is applied to a welded joint portion between a cover member (first member) 32 and upper and lower members (second member) 30, 31 of an axle case 34 such as that shown in FIG. 10. FIG. 5 shows a cross section of the joint portion between the cover member 32 and the upper and lower members 30, 31.

The cover member 32 is hemispherical, and a flange 32a is formed on the peripheral edge portion thereof The flange 32a of the cover member 32 is superposed on the upper and lower members 30, 31, whereupon fillet welding is implemented over the entire circumference of the flange 32a to join the members together. Note that in this embodiment, both the cover member 32 and the upper and lower members 30, 31 are molded by pressing a metallic sheet material, and the sheet thickness of the upper and lower members 30, 31 is greater than that of the cover member 32.

Figure 5:
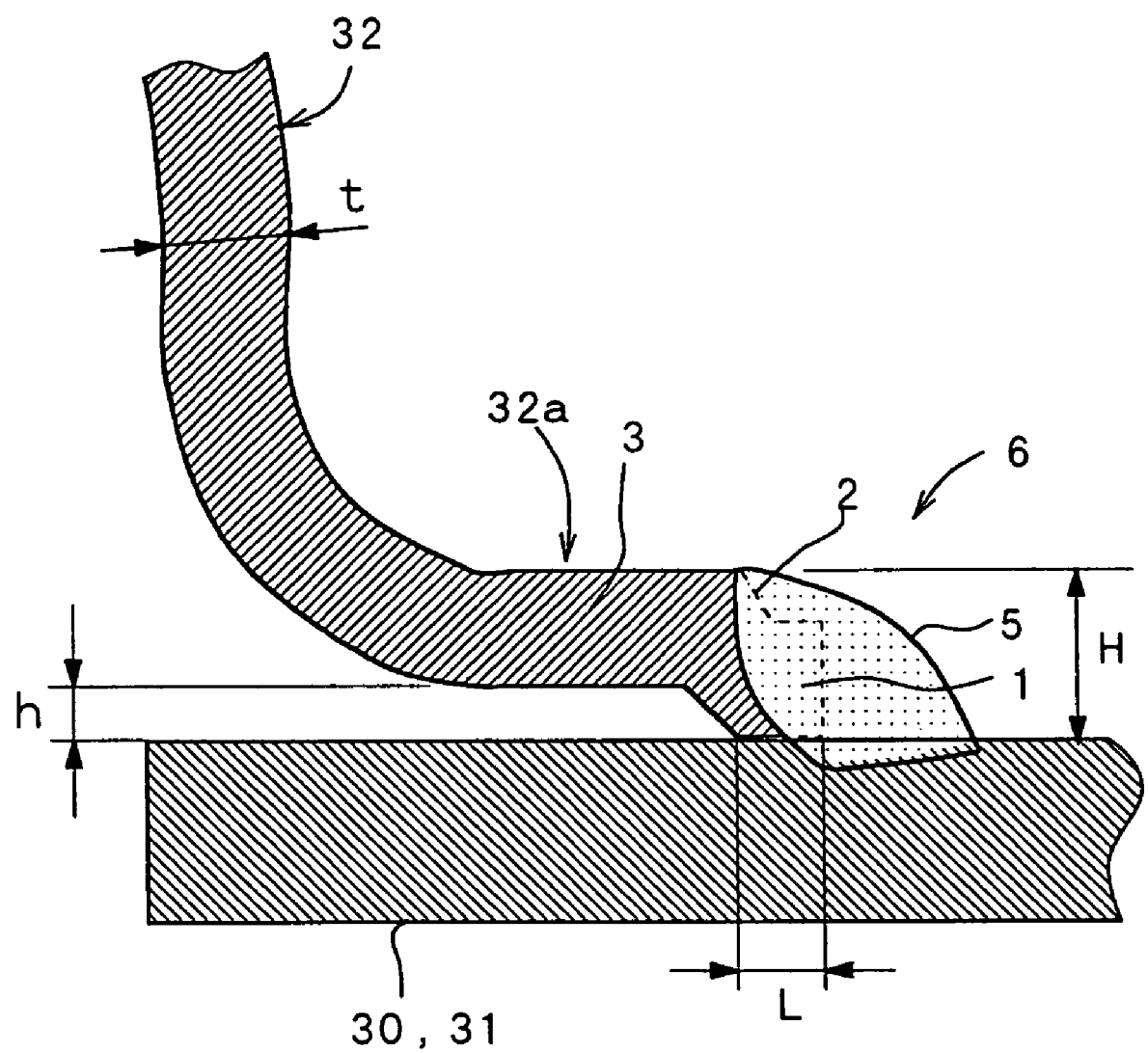
FIG. 5 is a sectional view of a welded portion constitution according to a further embodiment of the present invention.

A feature of the welded portion constitution of this embodiment is that the flange 32a of the cover member 32 is formed by being bent into a stepped form, as can be seen in FIG. 5. More specifically, the flange 32a comprises a contact portion 1 positioned on the outermost peripheral portion of the flange 32a such that the inner surface thereof contacts the outer surface of the upper and lower members 30, 31, an inclined portion 2 formed in series with the contact portion 1 and inclined from the contact portion 1 in a direction away from the surface of the upper and lower members 30, 31, and a stepped portion 3 formed in series with the inclined portion 2 and extending substantially parallel to the outer surface of the upper and lower members 30, 31. The inner surface of the stepped portion 3 is disposed at an interval corresponding to a distance h from the outer surface of the upper and lower members 30, 31. The contact portion 1, inclined portion 2, and stepped portion 3 are formed around the entire circumference of the flange 32a. Since the flange 32a formed in this manner may be molded at the same time as the cover member 32 is press molded, a simple and low-cost structure can be obtained.

Figure 12:
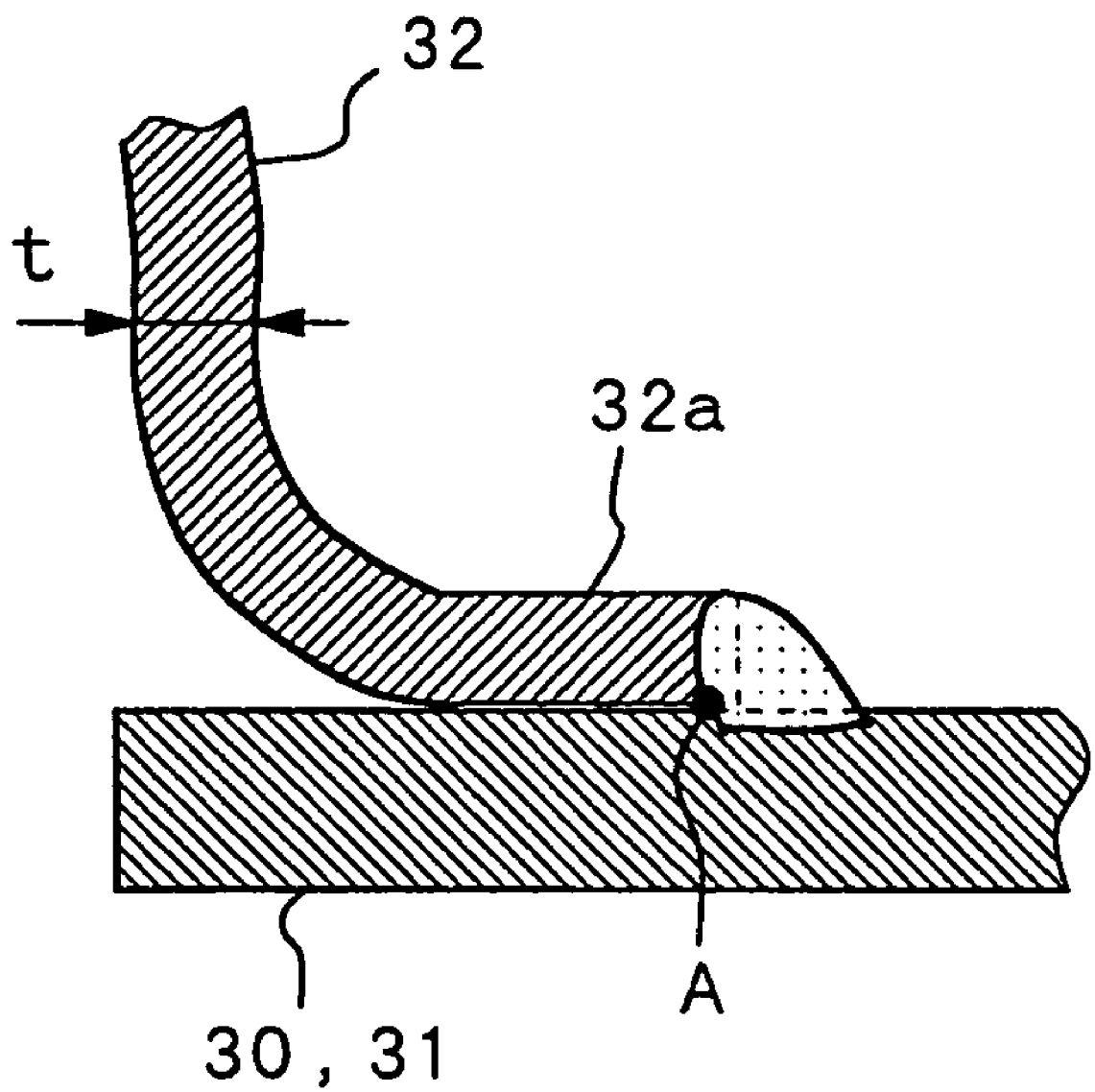
FIG. 12 is a sectional view of a welded joint portion between a cover member and upper and lower members of a conventional axle case.

This welded portion constitution also comprises a weld bead 5 which covers the outer surface of the contact portion 1 and at least a part of the outer surface of the inclined portion 2 on the flange 32a. In other words, the welding portion constitution is formed by bringing the inner surface of the contact portion 1 of the flange 32a into contact with the outer surface of the upper and lower members 30, 31, and performing fillet welding between the flange 32a and upper and lower members 30, 31 such that the weld bead 5 is formed over the outer surface of the contact portion 1 and at least a part of the outer surface of the inclined portion 2. In this embodiment, the weld bead 5 is formed over the entire outer surface of the inclined portion 2. Accordingly, the effective height H of a joint portion 6 between the cover member 32 and upper and lower members 30, 31 is substantially equal to the distance from the outer surface of the upper and lower members 30, 31 to the outer surface of the stepped portion 3. Since the stepped portion 3 is disposed at an interval corresponding to the distance h from the outer surface of the upper and lower members 30, 31, the effective height H of the joint portion 6 is naturally larger than the sheet thickness t of the cover member 32 (flange 32a) substantially by the distance h (H≈t+h). Hence, by forming the end portion of the flange 32a in stepped form and fillet welding the entirety of the stepped portion to the upper and lower members 30, 31, this welded portion constitution achieves an increase in the effective height H of the joint portion 6 without increasing the sheet thickness t of the cover member 32. In other words, by forming the end portion of the flange 32a in stepped form, the welded portion constitution of this embodiment achieves an increase in the formation area of the welding bead 5 (in a conventional welded portion constitution such as that shown in FIG. 12, the formation area of the weld bead is substantially equal to the sheet thickness t of the cover member 32).

Hence in the welded portion constitution of this embodiment, the effective height H of the joint portion 6 between the cover member 32 and upper and lower members 30, 31 is larger than the sheet thickness t of the cover member 32, and thus an improvement in the strength of the joint portion 6 which is substantially identical to that achieved by increasing the sheet thickness t of the cover member 32 is obtained. In other words, the sectional area of the joint portion 6 between the cover member 32 and upper and lower members 30, 31 is larger than that of a conventional joint portion, and hence stress generated in the joint portion 6 by various loads and moments acting on the axle case 34 is reduced. As a result, cracking caused by stress concentration can be prevented.

Note that in this embodiment, an example was described in which the weld bead 5 is formed over the entire outer surface of the inclined portion 2, but the present invention is not limited on this point, and the effect of a reduction in stress over a conventional welded portion constitution can still be obtained as long as the weld bead 5 is formed so as to cover at least a part of the outer surface of the inclined portion 2.

Further, according to the welded portion constitution of this embodiment, the strength of the joint portion 6 can be improved without increasing the sheet thickness t of the cover member 32 or providing an annular reinforcing member, and hence there is no increase in the overall weight or number of components of the axle case 34. There is also no large increase in the manufacturing cost thereof.

Note that if even greater strength is desired in the joint portion 6 between the cover member 32 and the upper and lower members 30, 31, an annular reinforcing member may of course be provided between the upper and lower members 30, 31 and the cover member 32 in this embodiment.

To confirm the stress reduction effect of the welded portion constitution of this embodiment, the present inventors created an analytical model emulating a cross section of the cover member 32 and the upper and lower members 30, 31, and performed an analysis of the stress generated on the joint portion 6 when a predetermined load was applied to the model. Two models were created, one emulating the conventional welded portion constitution shown in FIG. 6a, and one emulating the welded portion constitution of this embodiment, as shown in FIG. 6b. The sheet thickness t of the cover member 32 was set at 5 mm in both models, and the sheet thickness T of the upper and lower members 30, 31 was set at 10 mm in both models. In the model emulating this embodiment shown in FIG. 6b, the distance h between the inner surface of the stepped portion 3 and the outer surface of the upper and lower members 30, 31 was set at 2 mm.

A load f per predetermined cover perimeter unit (100 N/mm) was then applied to a predetermined location on the cover member 32 of the two models, and the stress generated on the joint portion 6 was analyzed at three points A, B, C.

Figure 6A:
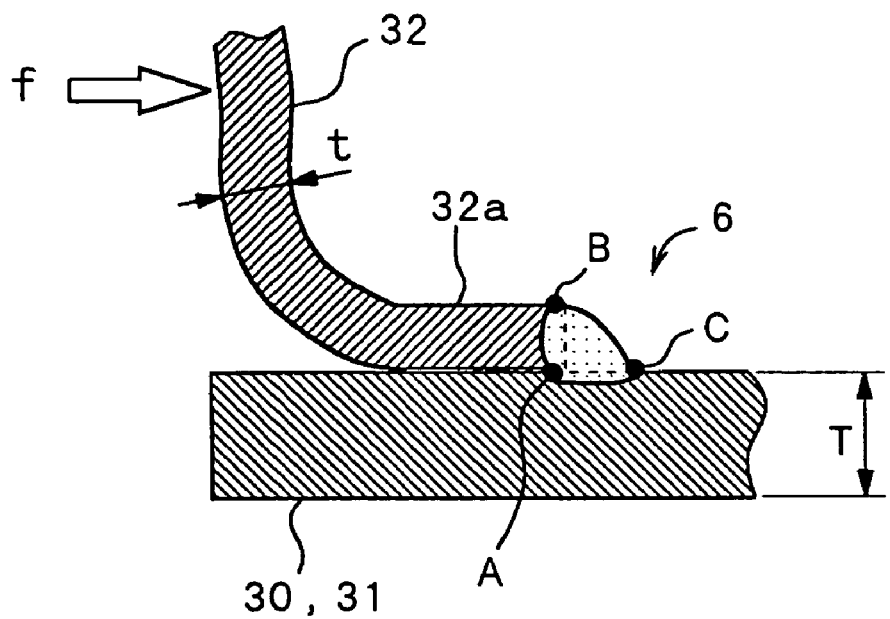
FIG. 6a is a view showing a sectional model used in an analysis of the stress that is generated in a welded joint portion, and shows an analytical model emulating a conventional welded portion constitution.
Figure 6B:
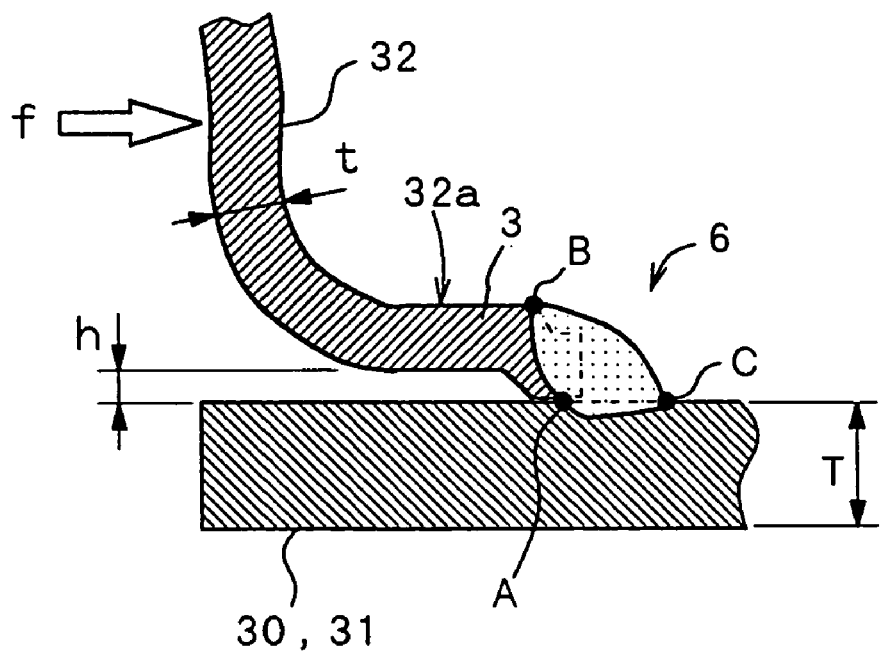
FIG. 6b is a view showing a sectional model used in an analysis of the stress that is generated in a welded joint portion, and shows an analytical model emulating the welded portion constitution of FIG. 5.

As a result, it was learned that when the size of identical elements is set at 1 mm, the stress generated at the point A, which is the location at which the greatest stress concentration was expected, was 472 MPa in the model corresponding to the conventional example in FIG. 6a and 283 MPa in the model corresponding to this embodiment in FIG. 6b. Hence a stress reduction of approximately 40% was obtained over the model corresponding to the conventional example. The stress generated at the point B was 379 MPa in the model in FIG. 6a, but 343 MPa in the model in FIG. 6b, and hence a reduction of approximately 9% was obtained over the model corresponding to the conventional example. The stress generated at the point C was 360 MPa in the model in FIG. 6a, but 275 MPa in the model in FIG. 6b, and hence a reduction of approximately 24% was obtained over the model corresponding to the conventional example.

Note that all of these results are analysis values of stress concentration portions, and are therefore dependent on element size, all of the values described above being unique to a case in which the element size is set at approximately 1 mm. However, the evaluation by relative comparison can be considered universal.

Hence it was learned that according to the welded portion constitution of this embodiment, stress generated in the welded joint portion 6 is reduced. In particular, it was learned that the stress generated at the point A, which is the location experiencing the greatest concentration of stress in a conventional welded portion constitution, is greatly reduced by approximately 40%. This indicates that damage (cracking) to the welded joint portion 6 can be prevented effectively. A reduction in the stress generated in the welded joint portion 6 also leads to an increase in the longevity of the welded portion constitution 6, and accordingly of the entire axle case 34.

The present inventors have confirmed that by setting the various dimensions of the stepped portion of the flange 32a within a predetermined range, the stress reduction effect can be obtained even more effectively. This will be described below using FIG. 5.

Figure 7:
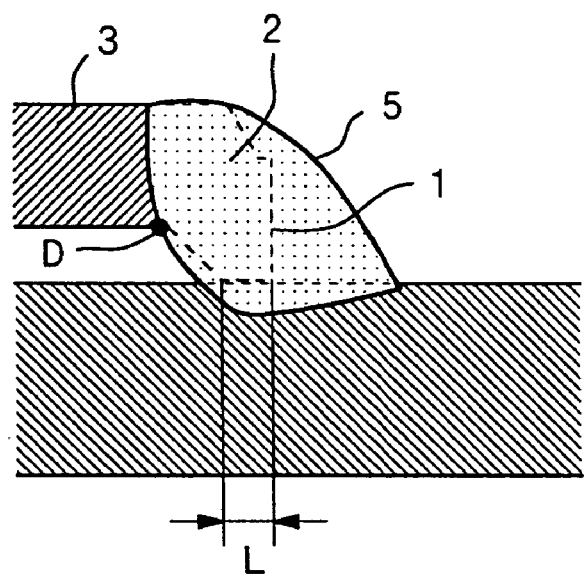
FIG. 7 is a sectional view showing an example in which the contact length of a contact portion is too short.

First, the contact length (length in the diametrical direction) L of the contact portion 1 is set within an optimum range of thirty to sixty percent of the sheet thickness t of the cover member 32. If the contact length L is too short, for example, as shown in FIG. 7, the penetration of the weld bead 5 over the contact portion 1 becomes too large, and the weld bead 5 penetrates to the inside of the contact portion 1 (inner surface side of the inclined portion 2). As a result, stress may concentrate at the point in the drawing indicated by D. Further, as shown in FIG. 7, if the weld bead 5 covers the entirety of the contact portion 1 and inclined portion 2, the stepped portion 3 may melt down. Hence the contact length L is preferably set such that the weld bead 5 does not penetrate the entire inner surface of the contact portion 1.

Figure 8:
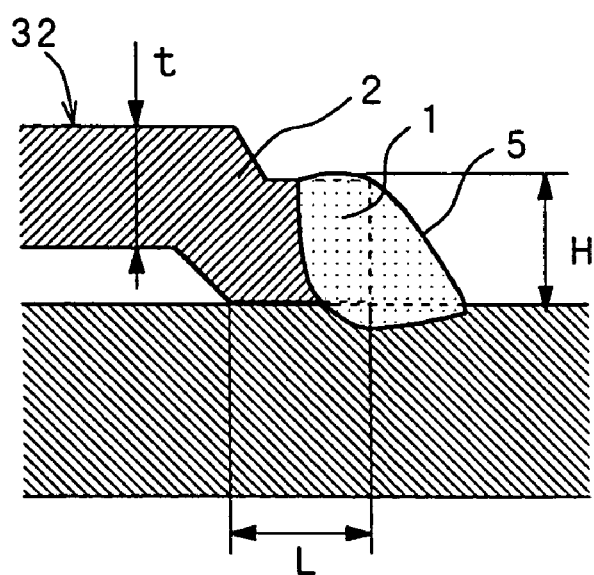
FIG. 8 is a sectional view showing an example in which the contact length of the contact portion is too long.

Conversely, if the contact length L is too large, as shown in FIG. 8, it becomes impossible to form the weld bead 5 over the inclined portion 2. As a result, the effective height H of the welded joint portion 6 becomes substantially equal to the sheet thickness t of the cover member 32, and the stress reduction effect described above cannot be obtained.

The interval h between the stepped portion 3 and the upper and lower members 30, 31 shown in FIG. 5 is set within an optimum range of twenty to fifty percent of the sheet thickness t of the cover member 32. If, for example, the interval h is too small, the effective height H of the welded joint portion 6 is little larger than the sheet thickness t of the cover member 32, and hence the stress reduction effect is small. If the interval h is too large, it becomes difficult to form the weld bead 5 over the outer surface of the inclined portion 2.

Up to this point, an example in which the present invention is applied to a joint portion between the cover member 32 and the upper and lower members 30, 31 of the axle case 34 has been described, but the present invention is also applicable to joint portions between various members.

For example, the welded portion constitution of this embodiment may be applied to a joint portion between a torque bracket (first member) 37 which supports a torque rod (not shown) used to mount the axle case 34 on a vehicle body frame, and an upper member (second member) 30 or lower member (second member) 31, as shown in FIG. 10.

Figure 9A:
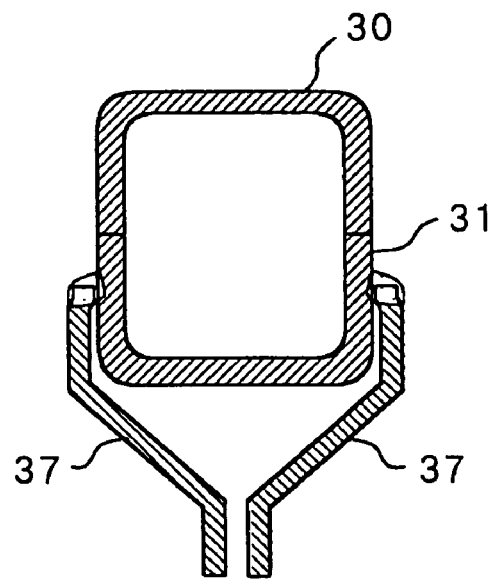
FIG. 9a is a sectional view showing a welded joint portion between a lower member of an axle case and a torque bracket.
Figure 9B:
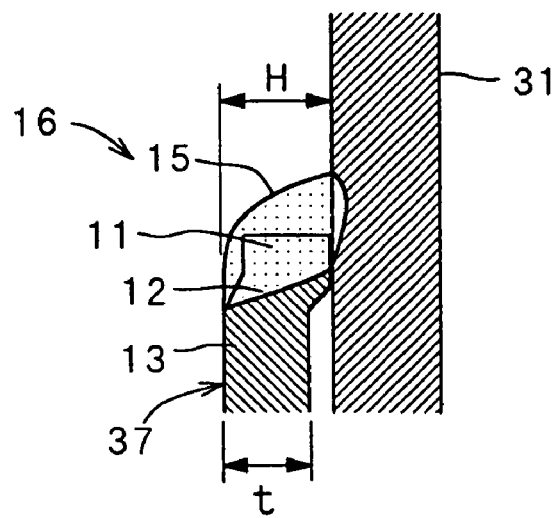

FIGS. 9a and 9b show an example in which the welded portion constitution and welding method of this embodiment are applied to a joint portion between the lower member 31 and the torque bracket 37. FIG. 9a is a sectional view of the joint portion between the lower member 31 and torque bracket 37, and FIG. 9b is an enlarged sectional view thereof.

As shown in FIG. 9b, a contact portion 11 which contacts the lower member 31, an inclined portion 12 formed in series with the contact portion 11 and inclined from the contact portion 11 in a direction away from the lower member 31, and a stepped portion 13 formed in series with the inclined portion 12 and disposed at a predetermined interval from the lower member 31 are provided on the end portion of the torque bracket 37 on the side which is joined to the lower member 31, and a weld bead 15 is formed over the outer surface of the contact portion 11 and the entire outer surface of the inclined portion 12.

Likewise in this embodiment, the effective height H of a joint portion 16 between the torque bracket 37 and lower member 31 is greater than the sheet thickness t of the torque bracket 37, and hence the strength of the joint portion 16 can be increased.

Thus the welded portion constitution and welding method of this embodiment can be applied to any joint between a plurality of members.

What is claimed is:

1. A constitution for a butt-welded portion between tubular members in which a tubular strip is arranged inside of the abutting portion, comprising:
   a contact portion formed on an end portion of at least one of said tubular members in contact with said strip;
   an inclined portion formed in series with said contact portion and inclined from said contact portion in a direction away from said strip;
   a stepped portion formed in series with said inclined portion and disposed at a predetermined interval from said strip; and a weld bead provided so as to entirely cover an outer surface of said contact portion and at least partially cover an outer surface of said inclined portion, so as to penetrate a part of an inner surface of said contact portion but not penetrate an inner surface of said inclined portion;

wherein said contact, inclined and stepped portions are formed by a bend in said end portion.

2. The welded portion constitution according to claim 1, wherein the contact length between said contact portion and said strip is set within a range of approximately thirty to sixty percent of the sheet thickness of said tubular member.

3. The welded portion constitution according to claim 1, wherein the interval between said stepped portion and said strip is set within a range of approximately twenty to fifty percent of the sheet thickness of said tubular member.

4. A constitution for a fillet-welded portion between a sheet material and a base material, comprising:

a contact portion formed on an end portion of said sheet material in contact with said base material;

an inclined portion formed in series with said contact portion and inclined from said contact portion in a direction away from said base material;

a stepped portion formed in series with said inclined portion and disposed at a predetermined interval from said base material; and a weld bead provided so as to entirely cover an outer surface of said contact portion and at least partially cover an outer surface of said inclined portion, so as to penetrate a part of an inner surface of said contact portion but not penetrate an inner surface of said inclined portion;

wherein said contact, inclined and stepped portions are formed by a bend in said end portion.

5. The welded portion constitution according to claim 4, wherein the contact length between said contact portion and said base material is set within a range of thirty to sixty percent of the sheet thickness of said sheet material.

6. The welded portion constitution according to claim 4, wherein the interval between said stepped portion and said base material is set within a range of twenty to fifty percent of the sheet thickness of said sheet material.

7. The welded portion constitution according to claim 1, wherein said strip is integral with one of said tubular members.

\* \* \* \* \*